(12) United States Patent
Subramanian et al.

(10) Patent No.: US 7,685,069 B1
(45) Date of Patent: Mar. 23, 2010

(54) SYSTEMS AND METHODS FOR GENERATING A FINANCIAL MARKET INDEX

(75) Inventors: Raman Aylur Subramanian, Princeton, NJ (US); Arun Kumar, Edison, NJ (US); Giacomo Fachinotti, Gy (CH); Valery Rousseau, Bons-en Chablais (FR); Khalid Ghayur, Princeton, NJ (US)

(73) Assignee: Morgan Stanley Capital International, Inc., New York, NY (US)

( * ) Notice: Subject to any disclaimer, the term of this patent is extended or adjusted under 35 U.S.C. 154(b) by 650 days.

(21) Appl. No.: 11/242,994

(22) Filed: Oct. 4, 2005

(51) Int. Cl.
*G06Q 40/00* (2006.01)
(52) U.S. Cl. .................. 705/45; 705/35; 705/36 R; 705/37; 705/38; 705/39; 705/40; 705/41; 705/42; 705/43; 705/44
(58) Field of Classification Search .......... 705/7, 705/10, 11, 35–45
See application file for complete search history.

(56) References Cited

U.S. PATENT DOCUMENTS

| | | | |
|---|---|---|---|
| 6,484,152 B1 * | 11/2002 | Robinson | 705/36 R |
| 7,149,716 B2 * | 12/2006 | Gatto | 705/36 R |
| 2002/0059126 A1 * | 5/2002 | Ricciardi | 705/36 |
| 2003/0212621 A1 * | 11/2003 | Poulter et al. | 705/36 |
| 2004/0111350 A1 * | 6/2004 | Charnley, Jr. | 705/36 |
| 2005/0004832 A1 * | 1/2005 | Ostergard et al. | 705/11 |

FOREIGN PATENT DOCUMENTS

EP          1686517          *    8/2006

OTHER PUBLICATIONS

Chow, Victor et al., International Portfolio Selection and Efficiency Analysis, J. Review of Quantitative Finance and Accounting, vol. II, No. 1, pp. 47-67, Springer Netherlands, Mar. 1992.*
"New non-price indices from FTSE Group and GWA," London, Jul. 14, 2005.
"Index Methodology for the Forecasted Book Value Weighted Indices," MSCI, Princeton, NJ, Jul. 11, 2005.
R.D. Arnott et al., "Fundamental Indexation," Financial Analysts Journal, vol. 61, No. 2, Mar./Apr. 2005, pp. 83-99.

* cited by examiner

*Primary Examiner*—Charles R Kyle
*Assistant Examiner*—Robert R Niquette
(74) *Attorney, Agent, or Firm*—K&L Gates LLP

(57) ABSTRACT

A method of generating a financial market index. The method includes selecting a plurality of constituent securities to comprise the index and determining a weight for each of the securities based on at least one forecasted parameter that is determined for each of the plurality of constituent securities that comprise the index. The method also includes generating the financial market index based on the weights.

9 Claims, 2 Drawing Sheets

SYSTEMS AND METHODS FOR GENERATING A FINANCIAL MARKET INDEX

BACKGROUND

Market capitalization weighting of financial market indices is common because it results in indices that are macroeconomically consistent. Market capitalization weighting is consistent with a passive buy and hold strategy and is market-clearing. Also, according to the Capital Asset Pricing Model (CAPM), a capitalization weighted market portfolio is the only mean-variance portfolio of risky assets that is of interest to investors.

However, the notion that capitalization weighted indices are mean variance efficient has been questioned. In the presence of price-inefficiency (informational inefficiency) capitalization-weighting may systematically overweight securities that trade above their fair value and underweight securities that trade below the fair value, thus resulting in capitalization-weighted indices that are inefficient.

Various alternatives to capitalization-weighting have been suggested and used. Some other ways of weighting securities in an index include price-weighting (Dow Jones Industrial Average), equal weighting (Standard & Poor's), factor and GDP weighting (MSCI).

Proponents of fundamental weighting schemes have illustrated that indices that use weights that are derived from a company's historical fundamental information such as gross revenue, equity book value, gross sales, gross dividends, cash flow and total employment deliver better mean-variance performance, ex-post, relative to capitalization-weighted indices.

However, one issue with using historical fundamental information is that it is based on history. Thus, companies which have grown in the past and have large book values or revenues will get a bigger weight in indices constructed using historical fundamental values weighting. Equity markets, however, are forward-looking and discount the future. Thus indices that are constructed using historical fundamental values weighting alone may not be appropriate as benchmark indices which can be used for asset allocation, performance evaluation, etc as they reward only past size and growth in the fundamental factor used for weighting. Such a security weighting scheme, if used for an investment strategy or in portfolio construction, also would rely entirely on past realizations of fundamental values. By contrast, market capitalization weighting, because it is based on prices which reflect expectations about the future, favors future valuations exclusively.

SUMMARY

In various embodiments, the present invention is directed to a method of generating a financial market index. The method includes selecting a plurality of constituent securities to comprise the index and determining a weight for each of the securities based on at least one forecasted parameter that is determined for each of the plurality of constituent securities that comprise the index. The method also includes generating the financial market index based on the weights.

In various embodiments, the present invention is directed to a computer readable medium having stored thereon instructions which, when executed by a processor, cause the processor to:

select a plurality of constituent securities to comprise a financial market index;

determine a weight for each of the securities based on at least one forecasted parameter that is determined for each of the plurality of constituent securities that comprise the index; and generate the financial market index based on the weights.

In various embodiments, the present invention is directed to an apparatus. The apparatus includes means for selecting a plurality of constituent securities to comprise a financial market index and means for determining a weight for each of the securities based on at least one forecasted parameter that is determined for each of the plurality of constituent securities that comprise the index. The apparatus also includes means for generating the financial market index based on the weights.

In various embodiments, the present invention is directed to a security having a value, wherein the value is determined with reference to a financial market index, and wherein the financial market index is computed based on at least one forecasted parameter that is determined for each of a plurality of constituent securities that comprise the index.

In various embodiments, the present invention is directed to an exchange traded fund having a market value, wherein the market value is determined with reference to a financial market index, and wherein the financial market index is computed based on at least one forecasted parameter that is determined for each of a plurality of constituent securities that comprise the index.

In various embodiments, the present invention is directed to a method of managing a financial portfolio. The method includes determining whether to add or delete a component of the portfolio based on a financial market index, wherein the financial market index is computed based on at least one forecasted parameter that is determined for each of a plurality of constituent securities that comprise the index.

DESCRIPTION

Various embodiments of the present invention may be employed to generate a financial market index using forecasted values rather than purely historical values. For example, forecasted book values may be used to weight an index. Various embodiments of the present invention combine one or more historical fundamental values, which may be less subject to error, and adjust the values for expectations about the future. Various embodiments address the potential issue caused by market capitalization-weighting in the presence of price inefficiency without sacrificing the forward looking nature of financial markets.

Figure 1:
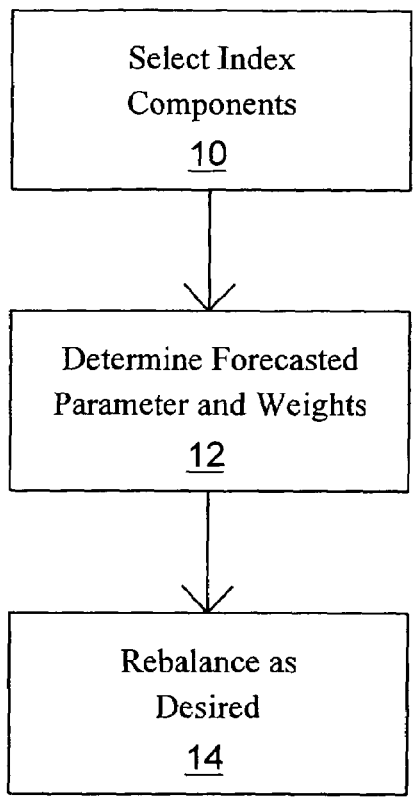
FIG. 1 illustrates an embodiment of a process for generating a financial market index.

FIG. 1 illustrates an embodiment of a process for generating a financial market index. At step 10, the constituents (i.e., the component securities) that comprise the index are selected. The constituents may be selected based on any desired factor such as, for example, industry type, country, or size (e.g., small cap, large cap, etc.). At step 12, at least one forecasted parameter and a weight, based on the forecasted parameter, are determined for each constituent. The forecasted parameter may be, for example, the forecasted book value, forecasted gross revenue, forecasted gross sales, forecasted gross dividends, forecasted cash flow, forecasted total employment, etc., or any combination of such parameters.

At step 14, the weights for each constituent in the index may be rebalanced as desired. For example, the weights for each constituent may be rebalanced in connection with an annual full index review. Likewise, selection of new constituents (or de-selection of existing constituents) may be performed as desired, in which case the weights for each constituent may be re-calculated.

Figure 2:
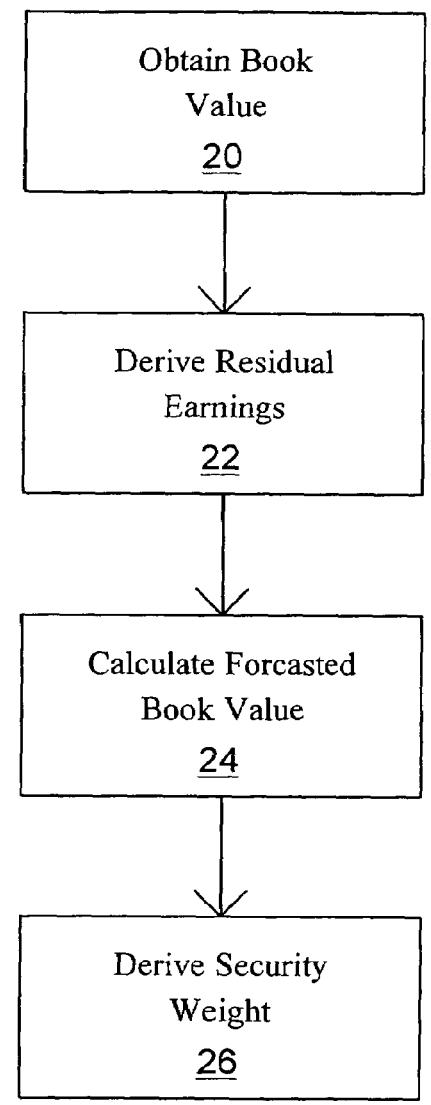
FIG. 2 illustrates an embodiment of a process for determining a forecasted parameter and weights of constituents in a financial market index.

FIG. 2 illustrates an embodiment of a process for determining a forecasted parameter and weights of constituents in a financial market index. Various techniques may be used for forecasting a parameter. For example, if the parameter being forecasted is one for which forecasts are generally available (e.g., earnings), the forecasted parameter may use the available forecast. For parameters where market forecasts are generally not available, the forecasted parameter may be generated using techniques which may rely on historical observations, reasonable judgments, and/or combinations of available information.

In the example illustrated in FIG. 2, the forecasted parameter is the forecasted book value. The technique illustrated in the example of FIG. 2 relies on historical growth rates of earnings applied to residual earnings and combined with the book value to generate the forecasted book value. At step 20, the latest reported book value (Book Value$_0$) of each constituent security is taken from, for example, public company filings. For example, book values of U.S. companies may be obtained from SEC filings such as quarterly (10 Q) and annual (10 K) filings.

At step 22, the residual earnings of each constituent security is derived by the following equation:

Residual Earnings$_t$=Latest Reported Annual Earnings$_t$−Trailing Annualized Dividend$_t$ At step 24, the book value forecasted for time period n, calculated at time period 0, is given by the equation:

Forecasted Book Value$_n$ = Book Value$_0$ +
$$\sum_{i=1}^{n} \text{Residual Earnings}_0 \times (1 + \text{Long Term Historical EPS Growth})^n$$

For the calculation of the Long Term Historical EPS Growth (LT his EPS G), first a regression (ordinary least squares method) may be applied to the last 5 yearly restated EPS.

$EPS_t = a \times t + b$

Where:

a is the slope coefficient, b is the intercept, t is the year expressed in number of months.

An average absolute EPS or SPS may estimated as follows:

$$\tilde{E}\tilde{P}\tilde{S} = \sum_{i=1}^{n} \frac{|EPS_i|}{n}$$

The growth trend may be obtained as follows:

$$LT \text{ his } EPS \ G = \frac{a_{EPS}}{|\tilde{E}\tilde{P}\tilde{S}|}$$

In order to compute a meaningful long-term historical growth trend for the EPS, in various embodiments 5 years of comparable data are used. The growth trend may also be calculated using shorter or longer intervals as appropriate. In the event that comparable restated pro forma data are unavailable, the data may be restated using adjustments. In various embodiments, a minimum of the last four EPS values are needed to compute their historical growth trends. Growth trends for securities without sufficient EPS values are considered to be missing.

Table 1 illustrates an example of a calculation of EPS and SPS growth trends for a hypothetical constituent. Examples of methods for such a calculation are contained in U.S. patent application Ser. No. 10/833,860, filed Apr. 28, 2004 and entitled "Systems and Methods for Constructing a Value Index and a Growth Index," which is incorporated herein by reference.

TABLE 1

Example:
Calculating Long-term historical EPS trend Jan. 20, 2003

|  | Years | t | EPS | SPS |
| --- | --- | --- | --- | --- |
| Fiscal Year End 0 | Dec. 31, 1998 | 0 | −1.11 | 7.71 |
| Fiscal Year End 1 | Dec. 31, 1999 | 12 | −0.51 | 8.19 |
| Fiscal Year End 2 | Dec. 31, 2000 | 24 | 0.29 | 8.57 |
| Fiscal Year End 3 | Dec. 31, 2001 | 36 | 0.92 | 8.87 |
| Fiscal Year End 4 | Dec. 31, 2002 | 48 | 1.41 | 11.50 |
| a |  |  | 0.05 | 0.07 |
| a, annualized |  |  | 0.65 | 0.83 |
| Average Absolute EPS |  |  | 0.85 | 8.97 |
| Growth Trend |  |  | 76.3% | 9.21% |

At step 26 in FIG. 2 the security weight is derived using the following equation:

Security Weight=Forecasted Book Value/(Sum of Forecasted Book Value for All Index Constituents)

It can be understood that various embodiments of the techniques and methods described herein may be used to, for example, create and publish an index, offer a security that is linked to an index that is created using the techniques and methods described herein, offer an exchange traded fund (ETF) that replicates the performance of an index that is created using the techniques and methods described herein, and develop an investment strategy based on an index that is created using the techniques and methods described herein or to create and manage a portfolio.

Figure 3:
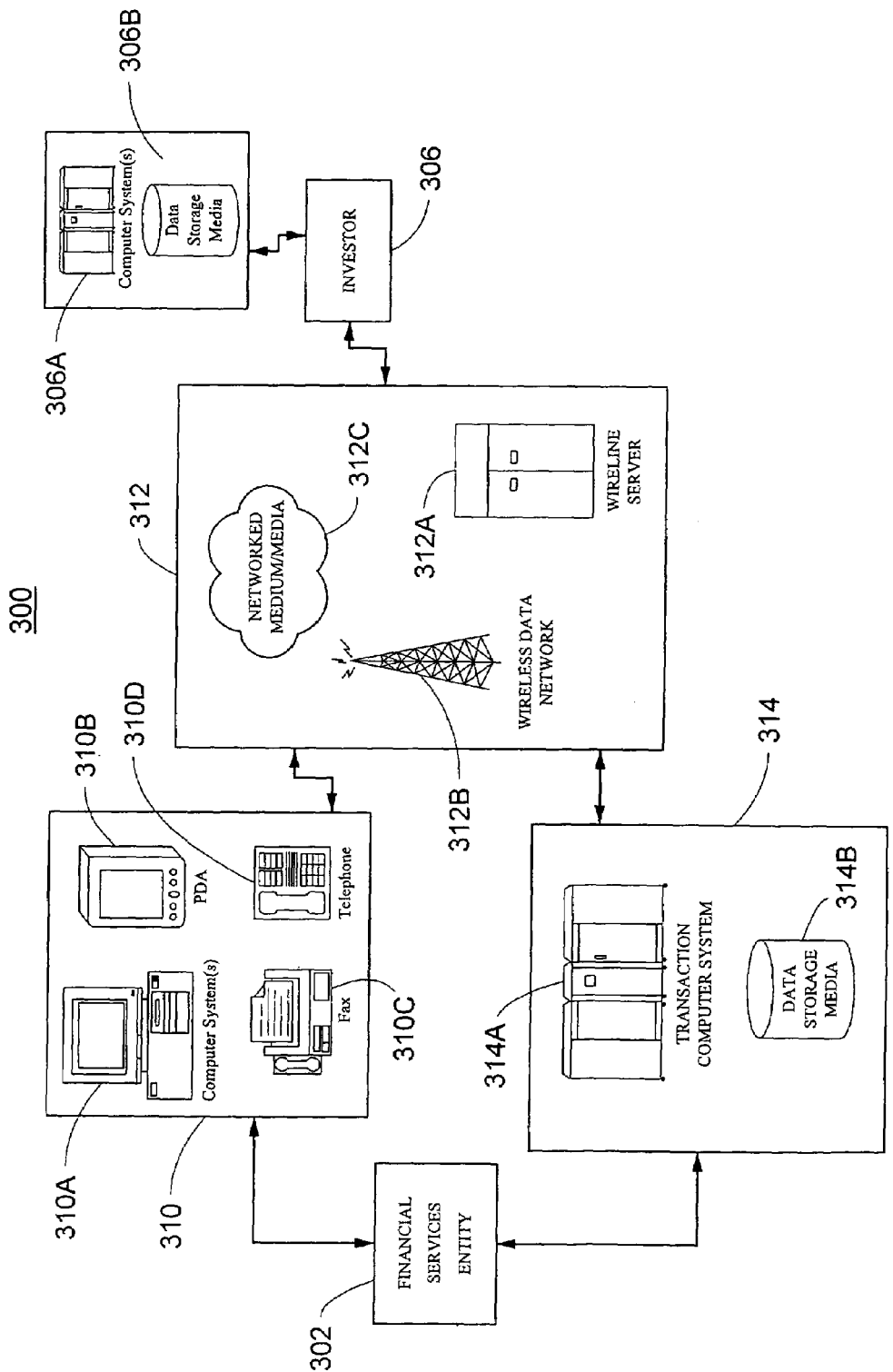
FIG. 3 illustrates a schematic diagram of examples of system and computer-readable medium embodiments provided in accordance with the present invention.

FIG. 3 illustrates a schematic diagram of examples of system and computer-readable medium embodiments provided in accordance with the present invention. As shown, a financial services entity 302 may communicate and/or exchange data with an investor 306. In various aspects, the financial services entity 302 may be operatively associated with one or more communications devices 310 such as, for example and without limitation, a computer system 310A, a personal digital assistant 310B, a fax machine 310C, and/or a telephone 310D (e.g., a wireline telephone, a wireless telephone, a pager, and the like), and/or other like communication devices. The communication devices 310 permit the financial services entity 302 and the investor 306 to communicate between/among each other through one or more communication media 312, such as by employing electronic mail communicated through one or more computer systems, for example. The communication media 312 may include, for example and without limitation, wireline communication means such as a wireline server 312A, a wireless data network 312B, and/or a connection through a networked medium or media 312C (e.g., the Internet, an extranet, an intranet, a wide area network (WAN), and/or a local area network (LAN)).

In addition, the financial services entity 302 (as well as the investor 306) may be operatively associated with one or more data processing/storage devices such as data processing/storage devices 314, for example. The financial services entity 302 may be operatively associated with one or more transaction computer systems 314A, for example, and/or one or more data storage media 314B configured to receive, store, analyze and/or otherwise process data and other information in association with communications that occur between/among the financial services entity 302 and the investor 306. In various aspects, the financial services entity 302 may be operatively associated, for example, with one or more accounting computer systems 314C and/or one or more tax computer systems 314D. The accounting/tax computer systems 314C, 314D may be configured for receiving, storing, and/or processing accounting/tax data, among other types of data, associated with one or more aspects of hedging securities, for example, of the present invention.

In various aspects, the investor 306 may be operatively associated with one or more computer systems 306A and/or one or more data storage media 306B. It can be appreciated that one or more of the computer systems 306A, 314A, 314C, 314D and/or one or more of the data storage media 306B, 314B may be employed to communicate, store, analyze, and/or otherwise process data related to financial transactions occurring between/among the financial services entity 302 and the investor 306. It can be understood that one or more steps of the methods described herein may be performed using, for example, any of the computer systems 310, 306A, and 314A. Also, in various embodiments of the present invention, market data may be input and stored on, for example, any of the data storage media 306B, 314B and/or on a storage medium or media on the computer system 310A.

The term "computer-readable medium" is defined herein as understood by those skilled in the art. It can be appreciated, for example, that method steps described herein may be performed, in certain embodiments, using instructions stored on a computer-readable medium or media that direct a computer system to perform the method steps. A computer-readable medium can include, for example and without limitation, memory devices such as diskettes, compact discs of both read-only and writeable varieties, digital versatile discs (DVD), optical disk drives, and hard disk drives. A computer-readable medium can also include memory storage that can be physical, virtual, permanent, temporary, semi-permanent and/or semi-temporary.

As used herein, a "computer" or "computer system" may be, for example and without limitation, either alone or in combination, a personal computer (PC), server-based computer, main frame, microcomputer, minicomputer, laptop, personal data assistant (PDA), cellular phone, pager, processor, including wireless and/or wireline varieties thereof, and/or any other computerized device capable of configuration for processing data for either standalone application or over a networked medium or media. Computers and computer systems disclosed herein can include memory for storing certain software applications used in obtaining, processing, storing and/or communicating data. It can be appreciated that such memory can be internal or external, remote or local, with respect to its operatively associated computer or computer system. The memory can also include any means for storing software, including a hard disk, an optical disk, floppy disk, ROM (read only memory), RAM (random access memory), PROM (programmable ROM), EEPROM (extended erasable PROM), and other suitable computer-readable media.

It is to be understood that the figures and descriptions of embodiments of the present invention have been simplified to illustrate elements that are relevant for a clear understanding of the present invention, while eliminating, for purposes of clarity, other elements. Those of ordinary skill in the art will recognize, however, that these and other elements may be desirable for practice of various aspects of the present embodiments. However, because such elements are well known in the art, and because they do not facilitate a better understanding of the present invention, a discussion of such elements is not provided herein. It can be appreciated that, in some embodiments of the present methods and systems disclosed herein, a single component can be replaced by multiple components, and multiple components replaced by a single component, to perform a given function or functions. Except where such substitution would not be operative to practice the present methods and systems, such substitution is within the scope of the present invention. Examples presented herein, including operational examples, are intended to illustrate potential implementations of the present method and system embodiments. It can be appreciated that such examples are intended primarily for purposes of illustration. No particular aspect or aspects of the example method, product, computer-readable media, and/or system embodiments described herein are intended to limit the scope of the present invention.

It should be appreciated that figures presented herein are intended for illustrative purposes and are not intended as construction drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of parts/elements/steps/functions may be made within the principle and scope of the invention without departing from the invention as described in the appended claims.

What is claimed is:

1. A method of generating a financial market index, the method comprising:

determining, using a computer system, a weight for each of a plurality of constituent securities that comprises the index by:

deriving residual earnings for each of the constituent securities;

calculating a forecasted book value for each of the constituent securities based on metrics that comprise (i) the residual earnings, (ii) a historical book value, and (iii) a historical earning per share growth value for each of the constituent securities, wherein the forecasted book value for each of the constituent securities for time period n, calculated at time period 0, is calculated based on the equation:

$$\text{Forecasted Book Value}_n = \text{Book Value}_0 + \sum_{i=1}^{n} \text{Residual Earnings}_0 \, x(1 + \text{Historical } EPS \text{ Growth})^n; \text{ and}$$

deriving the weight for each of the constituent securities based on the forecasted book value; and generating, with the computer system, a value for the financial market index based on the weights.

2. The method of claim 1, further comprising rebalancing the weights.

3. The method of claim 2, wherein the weights are rebalanced in connection with an annual full index review.

4. The method of claim 1, wherein the plurality of constituent securities are selected based on at least one of industry type, corporate nationality, and size of a plurality of corporations underlying the securities.

5. The method of claim 1, further comprising transmitting the value for the financial market index via a computer network to a remote computer device.

6. A computer readable medium having stored thereon instructions for generating a financial market index which, when executed by a processor, cause the processor to:

determine a weight for each of a plurality of constituent securities that comprises the financial market index by:

deriving residual earnings for each of the constituent securities;

calculating a forecasted book value for each of the constituent securities based on metrics that comprise (i) the residual earnings, (ii) a historical book value, and (iii) a historical earning per share growth value for each of the constituent securities, wherein the forecasted book value for each of the constituent securities for time period n, calculated at time period 0, is calculated based on the equation:

$$\text{Forecasted Book Value}_n = \text{Book Value}_0 + \sum_{i=1}^{n} \text{Residual Earnings}_0 \, x(1 + \text{Historical } EPS \text{ Growth})^n; \text{ and}$$

deriving the weight for each of the constituent securities based on the forecasted book value; and generate the value for the financial market index based on the weights.

7. The computer readable medium of claim 6, further having stored thereon instructions for generating the financial market index which, when executed by the processor, cause the processor to transmit the value for the financial market index via a computer network to a remote computer device.

8. A system for generating a financial market index, the system comprising:

a data storage medium that stores market data; and a computer system in communication with the data storage medium, wherein the computer system is programmed to generate a value for the financial market index based on the market data stored in the data storage medium by:

determine a weight for each of a plurality of constituent securities that comprises the financial market index by:

deriving residual earnings for each of the constituent securities;

calculating a forecasted book value for each of the constituent securities based on metrics that comprise (i) the residual earnings, (ii) a historical book value, and (iii) a historical earning per share growth value for each of the constituent securities, wherein the forecasted book value for each of the constituent securities for time period n, calculated at time period 0, is calculated based on the equation:

$$\text{Forecasted Book Value}_n = \text{Book Value}_0 + \sum_{i=1}^{n} \text{Residual Earnings}_0 \, x(1 + \text{Historical } EPS \text{ Growth})^n; \text{ and}$$

deriving the weight for each of the constituent securities based on the forecasted book value; and generate the value for the financial market index based on the weights.

9. The system of claim 8, wherein the computer system is further programmed to generate the value for the financial market index based on the market data stored in the data storage medium by transmitting the value for the financial market index via a computer network to a remote computer device.

\* \* \* \* \*